US009510149B2

(12) United States Patent
Kiskani et al.

(10) Patent No.: US 9,510,149 B2
(45) Date of Patent: Nov. 29, 2016

(54) LOCATION ESTIMATION WITHIN A WIRELESS MESH NETWORK UTILIZING WIRELESS SIGNAL SIGNATURES

(71) Applicant: ABB Technology AG, Zurich (CH)

(72) Inventors: Mohsen Karimzadeh Kiskani, Santa Cruz, CA (US); Amalavoyal Chari, Pacifica, CA (US); Ali Dabirmoghaddam, Santa Cruz, CA (US); Yvonne Anne Pignolet, Zurich (CH)

(73) Assignee: ABB Technology AG, Zurich (CH)

( * ) Notice: Subject to any disclaimer, the term of this patent is extended or adjusted under 35 U.S.C. 154(b) by 75 days.

(21) Appl. No.: 14/681,341

(22) Filed: Apr. 8, 2015

(65) Prior Publication Data

US 2016/0302035 A1 Oct. 13, 2016

(51) Int. Cl.
*H04W 4/02* (2009.01)
(52) U.S. Cl.
CPC ............. *H04W 4/023* (2013.01); *H04W 4/028* (2013.01)
(58) Field of Classification Search
CPC ........ G01S 5/0036; G01S 5/02; H04W 4/04; H04W 4/023; H04W 4/025; H04W 4/028; H04W 64/00
USPC .................. 455/67.11, 444, 446, 456.1–457
See application file for complete search history.

(56) References Cited

U.S. PATENT DOCUMENTS

| 6,104,344 A | 8/2000 | Wax et al. |
| 8,026,814 B1 * | 9/2011 | Heinze ................... G06Q 10/06 340/10.1 |
| 2003/0216143 A1 | 11/2003 | Roese et al. |

(Continued)

OTHER PUBLICATIONS

Notification of Transmittal of the International Search Report and the Written Opinion of the International Searching Authority, or the Declaration, International Application No. PCT/US2016/023626, having the international filing dat of Mar. 22, 2016, Mailed Jun. 6, 2016.

*Primary Examiner* — Michael Mapa
(74) *Attorney, Agent, or Firm* — Brian R. Short

(57) ABSTRACT

Systems, methods and apparatuses for estimating a location within an area are disclosed. One method includes determining a plurality of wireless signal signatures at a plurality of locations within the area, wherein each wireless signal signatures includes a characteristic of a plurality of wireless links between a device and a plurality of network access points at a one of the plurality of locations, wherein the plurality of wireless signal signatures are received by a network manager server. Further, the network manager server receives a present wireless signal signature of a current device. The method further includes estimating locations the current device, including comparing a present wireless signal signature of the current device with plurality of wireless signal signatures, and adaptively re-determining the plurality of wireless signal signatures based on at least one condition of a distributed wireless network that includes the plurality of network access points.

20 Claims, 4 Drawing Sheets

(56) References Cited

U.S. PATENT DOCUMENTS

| | | |
|---|---|---|
| 2007/0050824 A1 | 3/2007 | Lee et al. |
| 2007/0247366 A1 | 10/2007 | Smith et al. |
| 2010/0226279 A1 | 9/2010 | Georgis et al. |
| 2011/0201350 A1 | 8/2011 | Das et al. |
| 2011/0286437 A1* | 11/2011 | Austin .................... H04W 4/02 370/338 |
| 2012/0040653 A1 | 2/2012 | Mendis |
| 2012/0191512 A1* | 7/2012 | Wuoti ................ G06Q 30/0207 705/14.1 |
| 2012/0200457 A1 | 8/2012 | Farrokhi et al. |
| 2013/0234894 A1* | 9/2013 | Oka ...................... G01S 5/0252 342/451 |
| 2013/0300607 A1* | 11/2013 | Mansour ............... H04W 64/00 342/451 |
| 2013/0322329 A1 | 12/2013 | Visuri et al. |
| 2013/0322400 A1 | 12/2013 | Visuri et al. |
| 2014/0194139 A1 | 7/2014 | Yang et al. |
| 2014/0249771 A1 | 9/2014 | Yang et al. |
| 2015/0081583 A1 | 3/2015 | Butler et al. |
| 2015/0087328 A1 | 3/2015 | Chao et al. |
| 2015/0133149 A1* | 5/2015 | Kim ...................... H04W 64/00 455/456.1 |
| 2015/0373562 A1* | 12/2015 | Wirola ................. H04W 24/02 370/338 |
| 2016/0094951 A1* | 3/2016 | Yang ..................... H04W 4/028 455/456.1 |

\* cited by examiner

LOCATION ESTIMATION WITHIN A WIRELESS MESH NETWORK UTILIZING WIRELESS SIGNAL SIGNATURES

FIELD OF THE DESCRIBED EMBODIMENTS

The described embodiments relate generally to wireless communications. More particularly, the described embodiments relate to systems, methods and apparatuses for location estimation within a wireless mesh network utilizing wireless signal signatures.

BACKGROUND

Localization for indoor applications can be a challenging task if global positioning systems (GPS) are not available. There have been several attempts to achieve location estimation using wireless signals (for example, using IEEE 802.11 signals). The existing methods, however, mostly target cellphone applications and there has not been a focus, for example, on the localization of mobile routers in wireless mesh networks. However, the localization of mobile routers is particularly important since many applications of wireless mesh networks involve deployments in regions where GPS signals may not be available, such as underground mines and inside plants.

There have been several efforts to obtain location information in the absence of GPS data and in particular for indoor applications. Among them are navigation methods based on acoustic, optical, magnetic and electromagnetic waves. Applications involving wireless communication may leverage the information obtained through propagation of wireless signals for localization purposes. There are several methods of doing this, most notably geometric- and fingerprinting-based methods. The geometric methods use propagation properties of received wireless signals, and therefore, these are significantly dependent on the accuracy of a channel model of the transmission of the wireless signals. On the other hand, the fingerprinting-based approach merely relies on the signal signatures measured at each point and hence, is immune to the shortcomings induced by the inaccuracies of channel modeling.

It is desirable to have methods, systems and apparatuses for localization utilizing fingerprinting of the received wireless signal within a wireless mesh network.

SUMMARY

An embodiment includes a method of estimating a location of a device within an area. The method includes determining a plurality of wireless signal signatures at a plurality of locations within the area, wherein each wireless signal signatures includes a characteristic of a plurality of wireless links between a device and a plurality of network access points at a one of the plurality of locations, wherein the plurality of wireless signal signatures are received by a network manager server. Further, the network manager server receives a present wireless signal signature of a current device. The method further includes estimating locations of the current device, including comparing a present wireless signal signature of the current device with a plurality of wireless signal signatures, and adaptively re-determining the plurality of wireless signal signatures based on at least one condition of a distributed wireless network that includes the plurality of network access points.

An embodiment includes a network manager server of a wireless network. The network manager server is operative to receive a plurality of wireless signal signatures at a plurality of locations within the area, wherein each wireless signal signatures includes a characteristic of a plurality of wireless links between a device and a plurality of network access points at a one of the plurality of locations, receive a present wireless signal signature of a current device, estimate locations of the current device, comprising comparing a present wireless signal signature of the current device with the plurality of wireless signal signatures, and adaptively re-determine the plurality of wireless signal signatures based on at least one condition of a distributed wireless network that includes the plurality of network access points.

An embodiment includes a wireless mesh network. The wireless mesh network includes a plurality of wireless access nodes, each access node wirelessly connected directly to at least one of the plurality of wireless mesh network gateways, or indirectly connected to at least one of the plurality of wireless mesh network gateways through one or more upstream wireless access node. The wireless mesh network further includes a network manager server connected to the wireless mesh network, wherein the network manager server receives a plurality of wireless signal signatures at a plurality of locations within the area, wherein each wireless signal signatures includes a characteristic of a plurality of wireless links between a device and a plurality of network access points at a one of the plurality of locations, receive a present wireless signal signature of a current device, estimate locations of the current device, comprising comparing a present wireless signal signature of the current device with plurality of wireless signal signatures, and adaptively re-determine the plurality of wireless signal signatures based on at least one condition of a distributed wireless network that includes the plurality of network access points.

Other aspects and advantages of the described embodiments will become apparent from the following detailed description, taken in conjunction with the accompanying drawings, illustrating by way of example the principles of the described embodiments.

DETAILED DESCRIPTION

Figure 1:
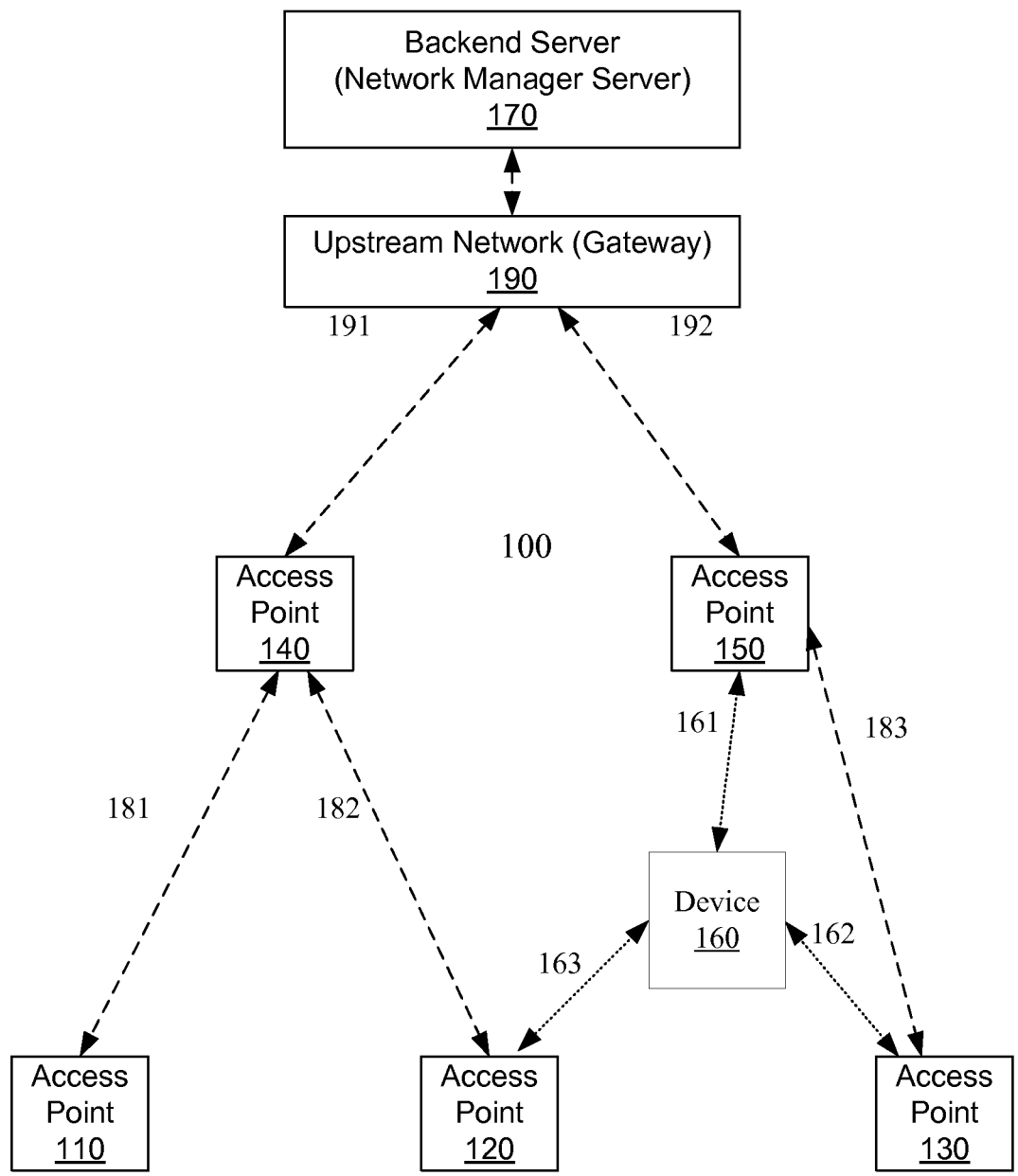
FIG. 1 shows a wireless network within an area that includes multiple network access points and a wireless device, according to an embodiment.

The embodiments described provide systems, methods and apparatuses for estimating a location of a device within an area. At least some of the described embodiments estimate locations within an area occupied by a wireless mesh network. For at least some embodiments, multiple locations within the area are characterized by measuring wireless signatures at the multiple locations. A location of a device can be estimated by comparing current wireless signatures of the device with the previously measured wireless signatures at the multiple locations.

At least some embodiments further include sensing conditions in which the multiple locations within the area are re-characterized or need to be re-characterized. That is, conditions of the wireless network can be sensed to determine that conditions of the wireless network have changed enough that a re-characterization is desired, needed or required. That is, for example, physical objects proximate to the wireless network may have moved, or sources of interference may have been introduced. Therefore, prior characterizations of the measured wireless signatures may have become stale and are no longer reliable. Therefore, the measurements of wireless signatures may need to be refreshed. For an embodiment, the access points of the wireless network monitor conditions of the wireless network to determine when a re-characterization is needed.

At least some of the described embodiments operate based on fingerprinting (measured wireless signatures) of the received wireless signal. That is, at different locations, the measured wireless signals received at the different locations are each unique and provide a "finger print" of that location. At least some of the described embodiments are particularly useful for location determination with a wireless mesh network in which routers (access points) of the wireless mesh networks are capable of performing the measurements. That is, for embodiments, the routers (access points) of the wireless mesh networks are conveniently located about the wireless mesh network. Therefore, measuring the wireless signature by the routers (access points) can provide measurements of the wireless signature at a good number of locations within the wireless mesh network.

At least some of the described embodiments include a training phase wherein a mobile device (such as, a mobile router) collects information from received signals that were transmitted from stationary adjacent access points. For at least some embodiments, the collected information includes the physical (MAC) address of the transmitting access points and the Received Signal Strength Indicator (RSSI) readings from the transmitting access points. For at least some embodiments, this information is collected and stored in a database as a signature, wherein the signature is bound to that particular training location.

Subsequently, in a tracking phase, this information is used to compare against the signatures received from the test points (a current device in which a location is being determined). For at least some embodiments, the similarity of the training and the test information is computed using a similarity measure. Next, based on the obtained similarities of the received information (wireless signal signatures), an estimation process is used to estimate the location of the test point (current device).

The described embodiments can utilize at least one of several possible estimation processes. An embodiment includes matching a k-nearest neighbor (KNN) in which the signature from the test location (of the current device) is matched against the k training points with the least Euclidean distance to that of the test location. A weighted average of the coordinates of the candidate points is computed as the estimation of the location of the test point. A special case of KNN solely considers the closest training point, known as the "nearest neighbor" method.

Another variant embodiment of the KNN is a k-nearest neighbor in s-dimensional space. This embodiment can be implemented to reduce the dimensions of the sample space and to improve the accuracy of the estimation process. To improve the accuracy further, the estimation process can be modified to predict the location of a moving device based on its previous history of locations. The intuitive idea behind this embodiment is that a moving device is expected to remain within a reasonable distance from its previous location over a short period of time.

To improve the accuracy, for an embodiment, the training phase is repeated every certain time interval. This is mainly to address estimation inaccuracies caused by environmental changes. The frequency of these repetitions may vary from an order of several days to months, depending on the variability of the environmental conditions as well as the network infrastructure.

At least some of the disclosed embodiments for localization (location estimation or determination) are based on an existing wireless network infrastructure. In a wireless mesh network, the existing static routers of the network can provide necessary signatures for the training phase. However, it is worth noting that the necessary signatures can also be collected from other wireless access points and devices that are not necessarily part of the mesh network infrastructure.

For at least some embodiments, the training and tracking phases are managed by a client of the wireless mesh network. For this embodiment, the client centrally controls the localization process on the routers (access points) in both training and tracking phases and is capable of populating location history and real-time location tracking.

For at least some embodiments the client collects the signatures of the mesh network access points that the client receives a signal from and initiates the collection of signatures at the access points via the network manager server. For an embodiment, in the training phase, the locations of the client need to be known. For an embodiment, in the tracking phase, an estimate of the client's location is either computed locally at the client or by the network manager server.

For an embodiment, the training and tracking phase are managed by a mobile router belonging to the mesh network. In this case the collection of signatures both on the mobile router and on the (static) access points can be initiated with or without involvement of the network manager server.

For an embodiment, the tracking phase is managed by the mesh network routers (wireless network access points). In this case an estimate of the location of the client or mobile router can be obtained with or without the involvement of the client or mobile router.

FIG. 1 shows a wireless network within an area 100 that includes multiple network access points and a wireless device, according to an embodiment. As shown, multiple network access points 110, 120, 130, 140, 150 are located within the area 100. The network access points 110, 120, 130, 140, 150 each support wireless communication with a wireless device 160. For example, wireless links 161, 162, 163 can be established between the wireless device 160 and the network access points 120, 130, 150. Further, for at least some embodiments, the network access points 110, 120, 130, 140, 150 support wireless communication between themselves, thereby forming a wireless mesh network. For example, wireless links 191, 192 can be established between an upstream network (for example, a wireless mesh network gateway) 190 and network access points 140, 150, and wireless links 181, 182, 183 can be established between network access points 140, 150 and network access points 110, 120, 130.

For at least some embodiments, a plurality of wireless signal signatures are determined at a plurality of locations within the area 100, wherein each wireless signal signatures includes a characteristic of a plurality of wireless links between the wireless device 160 and a plurality of network access points 110, 120, 130, 140, 150 at a one of the plurality of locations. That is, for example, the wireless device 160 travels (moves) to the plurality of locations, and one of the plurality of wireless signatures are measured or determined at each of the plurality of locations. Once measured, each of the plurality of wireless signatures is stored for future reference. For example, at one location, the wireless signal signatures through links 161, 162, 163 can be measured and stored. When the device 160 or a similar device later obtains a current wireless signal signature, that current wireless signal is compared with the stored wireless signal signatures, the location of the device 160 or a similar device is estimated.

For an embodiment, the access points themselves measure the wireless signal signatures. That is, the plurality of wireless signal signatures are determined at a plurality of locations within the area 100, wherein each wireless signal signatures includes a characteristic of a plurality of wireless links between one of the access points and a plurality of other network access points 110, 120, 130, 140, 150 at a one of the plurality of locations. Once measured, each of the plurality of wireless signatures is stored for future reference. For example, at one location, the wireless signal signatures through links 161, 162, 163 can be measured and stored. When the device 160 or a similar device later obtains a current wireless signal signature, that current wireless signal is compared with the stored wireless signal signatures, the location of the device 160 or a similar device is estimated.

For at least some embodiments, a network manager server 170 receives the plurality of wireless signal signatures. For an embodiment, the plurality of wireless signal signatures are measured at the wireless device 160, and then conveyed to the network manager server 170 via the network access points 110, 120, 130, 140, 150. That is, for example, the wireless device 160 measures the wireless signal signatures, and communicates the measurements through data packets through the network access points 110, 120, 130, 140, 150 to the network manager server 170.

For an embodiment, the plurality of wireless signal signatures are measured or determined at the network access points 110, 120, 130, 140, 150, and then conveyed to the network manager server 170 either directly (that is, a direct communication link exists between the network access point and the network manager server 170), or indirectly via another one of the network access points 110, 120, 130, 140, 150 (that is, a direct link exists between at least a subset of the network access points 110, 120, 130, 140, 150, and the other network access points communicate with the network manager server 170 through another one of the network access points).

For an embodiment, the plurality of wireless signal signatures are measured at the wireless device 160 and/or at the network access points 110, 120, 130, 140, 150, and conveyed to the network manager server 170. That is for an embodiment, the plurality of wireless signal signatures are measured at the wireless device 160 and/or at the network access points 110, 120, 130, 140, 150.

After the plurality of wireless signal signatures have been measured, at least some embodiments further include the network manager server 170 receiving a present wireless signal signature of a current device. The network manager server 170 then estimates locations of the current device, including comparing a present wireless signal signature of the current device with the plurality of wireless signal signatures. Further, the network manager server 170 adaptively re-determines the plurality of wireless signal signatures based on at least one condition of a distributed wireless network that includes the plurality of network access points.

Figure 2:
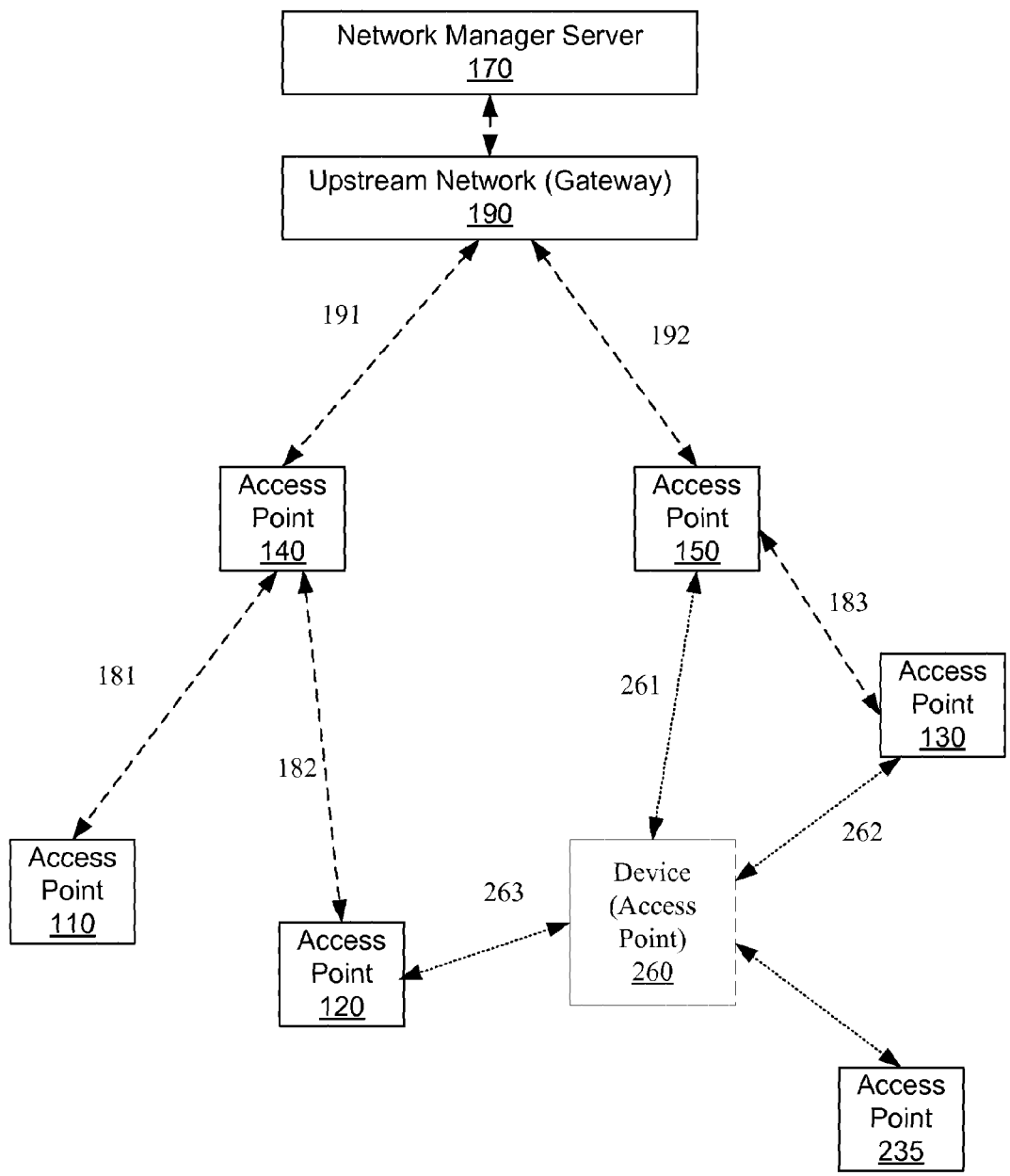
FIG. 2 shows a wireless mesh network that includes multiple network access points, according to an embodiment.

FIG. 2 shows a wireless mesh network that includes multiple network access points, according to an embodiment. For this embodiment, the training or characterization phase is performed by the network access points of the wireless mesh network. That is, the network access points themselves perform the characterization. The specific location of the network access points are determined and known a priori. Therefore, when the wireless signal signatures are determined at the network access points, a location corresponding to each of the wireless signal signatures is recorded. For example, the device 260 of FIG. 2 is an access point as well, which can include a downstream access point 235. The wireless signal signatures at the location of the device (access point) 260 are determined, for example, through the wireless links 261, 262, 263. Further, the process of characterizing or determining the wireless signal signatures can be determined at each of the network access points 110, 120, 130, 140, 150.

Later, a location of a device located within or proximate to the wireless mesh network can be estimated by comparing wireless signal signatures measured by the device with the wireless signal signature determined during the training or characterization phase.

As time passes by and conditions of the wireless mesh network change, and the measured wireless signal signatures may become stale, and may need to be re-characterized. For at least some embodiments, the plurality of network access points monitor wireless signal transmission between each other, and further determine whether to re-determine the plurality of wireless signal signatures at the plurality of locations within the area based on determined variations in the wireless signal transmission between the plurality of network access points. That is, changes in the transmission signal characteristics between network access points can be used to indicate that a re-characterization of the wireless signal signatures is needed.

For at least some embodiments, determining when to re-characterize the measured wireless signal signatures is based at least in part upon a change of routing selections through a wireless mesh network. That is, at least some embodiments of wireless mesh networks perform routing selections in which a downstream access point or access node selects a preferred routing path from the access point through upstream access points to, for example, an upstream gateway. For an embodiment, the access points monitor a routing parameter over time, and make new routing selections if a better routing selection becomes available. Typically, new routing selections are made when conditions of the wireless mesh network have changed. Conveniently, re-characterization of the measured wireless signal signatures can be desired when conditions of the wireless mesh network have changed. Therefore, at least some embodiments includes re-characterizing the measured wireless signal signatures based at least in part upon sensing or detecting a change of routing selections through the wireless mesh network.

The comparison of wireless signal signatures can be compromised due to the varying transmission signal power levels of different wireless devices. For at least some embodiments, a characteristics of the plurality of wireless links between the device and a plurality of network access points at a one of the plurality of locations includes a difference between a measured characteristic of the device and an average characteristic between the device and the plurality of network access points at the plurality of locations.

For at least some embodiments, an access point collects wireless signal signatures from nearby access points over a period of time, such as, for example, a couple of days. Further, at least some embodiments include determining values of average and deviation of the collected wireless signal signatures to be within a given bounds for the period of time. For an embodiment, if the average value or the deviation starts to diverge (for example, by more than a threshold, or outside of the given bounds), re-characterization of the wireless signal signatures is performed.

For an embodiment, the process of re-characterization includes a new phase of collecting wireless signatures. For an embodiment, the new phase is executed by the mesh network with or without the involvement of a mobile device. In the first case, the collection is analogous to the training phase. In the second case only signatures between stationary devices are collected again. These measurements can then be used to update the values of the mobile measurements as well. To this end, the relative differences and their variations of access point measurements before and after the re-characterization form the input for the calculation of the updated mobile signatures. For instance, consider the case where a first access point was moved. For the other access points in the first access point's vicinity this leads to an increase or decrease in the signal strength. The relative difference of this increase or decrease of static access points could be applied to signatures of mobile devices between and around these static access points. This allows the system to react to changing conditions without manual intervention. Of course the fact that re-characterization was necessary among the stationary routers can be used as an indicator that another training phase with a mobile device should be scheduled in the near future.

Figure 3:
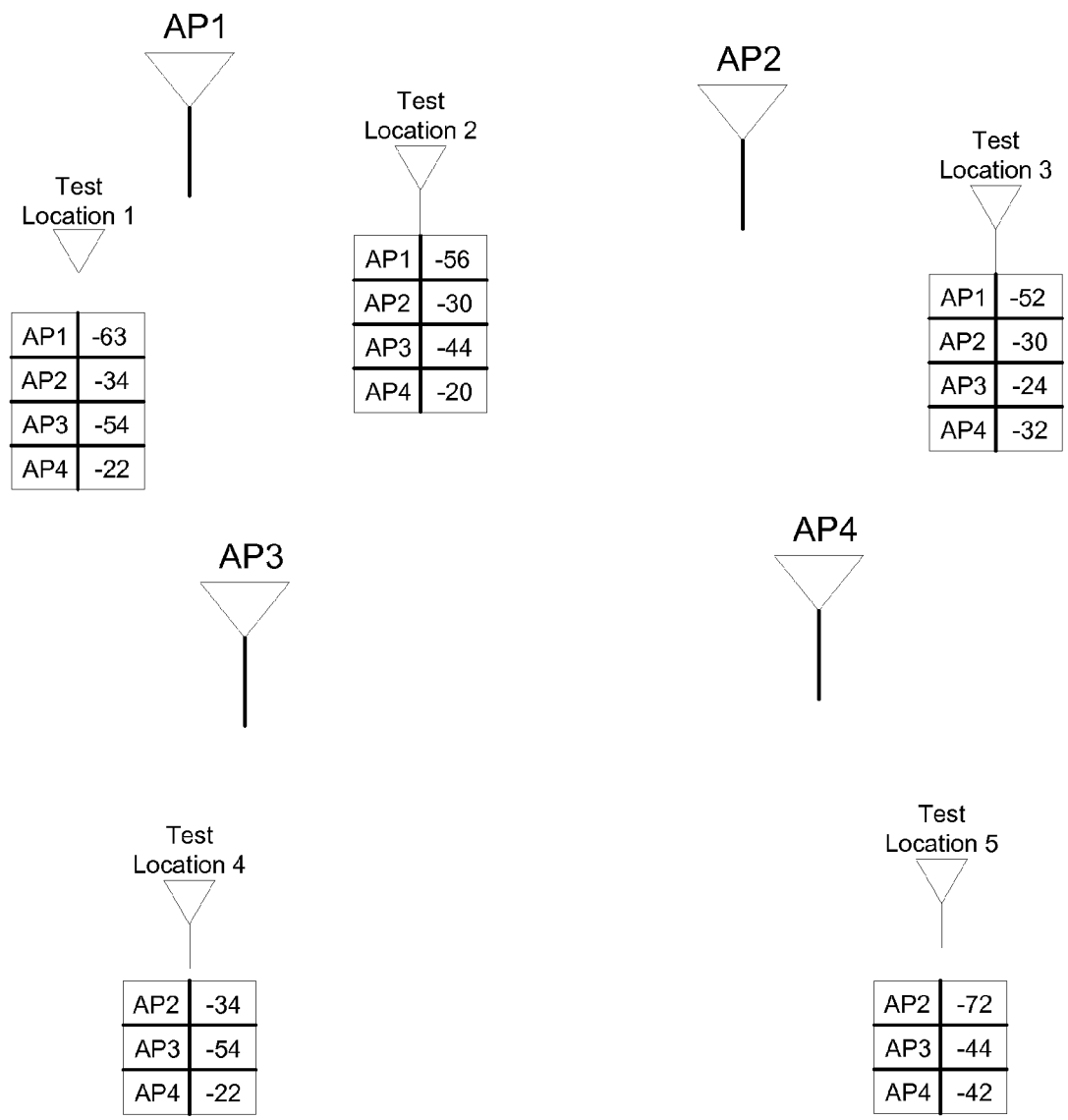
FIG. 3 shows examples of wireless signal signatures obtained at various locations within a wireless mesh network, according to an embodiment.

FIG. 3 shows examples of wireless signal signatures obtained at various locations within a wireless mesh network, according to an embodiment. FIG. 3 includes four antennas (AP1, AP2, AP3, AP4) that represent antennas of access points of the wireless network. Further, FIG. 3 includes test locations 1, 2, 3, 4, 5 in which wireless signal signatures are characterized or determined. As shown, each test location includes a signature represented by a table that includes each of the access points, and a corresponding measured received signal level. Generally, each of the wireless signal signatures includes the signal strengths of multiple of the measured received signal level of the most proximate access points. For at least some embodiments, apart from the signal level other signature components may be stored for each AP. For example, the order of the signal strengths, the variation over time for different periods and day/night differences, and/or if the signal belongs to a 5 Ghz or 2.4 Ghz antenna.

Figure 4:
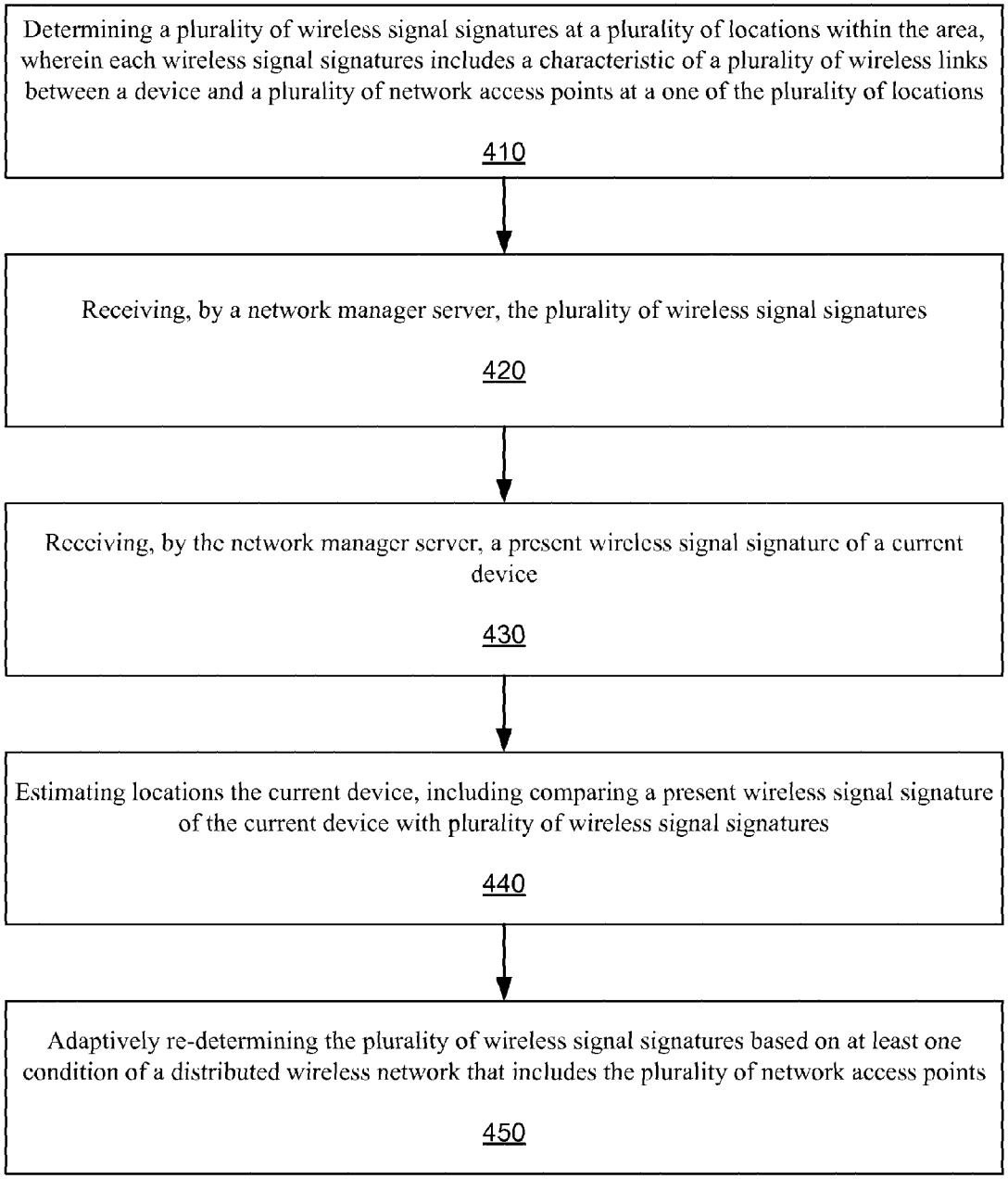
FIG. 4 is a flow chart that includes steps of a method of method of estimating a location within an area, according to an embodiment.

FIG. 4 is a flow chart that includes steps of a method of method of estimating a location within an area, according to an embodiment. A first step 410 includes determining a plurality of wireless signal signatures at a plurality of locations within the area, wherein each wireless signal signatures includes a characteristic of a plurality of wireless links between a device and a plurality of network access points at a one of the plurality of locations. A second step 420 includes receiving, by a network manager server, the plurality of wireless signal signatures. For an embodiment, the plurality of wireless signal signatures are measured at the device and conveyed (communicated) to the network manager server through the network access points. For an embodiment, the plurality of wireless signal signatures are measured at one or more of the plurality of network access points, and conveyed from the one or more network access points to the network manager server. A third step 430 includes receiving, by the network manager server, a present wireless signal signature of a current device. A fourth step 440 includes estimating locations the current device, including comparing a present wireless signal signature of the current device with plurality of wireless signal signatures. A fifth step 450 includes adaptively re-determining the plurality of wireless signal signatures based on at least one condition of a distributed wireless network that includes the plurality of network access points.

Various embodiments are possible for comparing the present wireless signal signature of the current device with plurality of wireless signal signatures. For at least some embodiments, the comparing includes one or more of a number of possible similarity measures. For an embodiment, the signatures are represented as vectors of RSSI values of mac addresses (or averages). For at least some embodiments, the similarity measures include one or more or a weighted combination of a Euclidean distance, an absolute distance, a number of inversions when using a ranking of MAC addresses according to their RSSI values, and/or a number of common MAC addresses among the top 10 access point MAC addresses.

At least some embodiments utilize various conditions for adaptively re-determining the plurality of wireless signal signatures. Among these conditions includes at least one or more of averages over small and large intervals of the wireless signal signatures deviating more than a predetermined threshold (at one access point or at several access points), a standard deviation of one or more wireless signal signatures increasing to above a predetermined threshold (at one access point or at several access points), an order of receive signal strength indicators of the proximate access points changing (or a certain fraction of positions of RSSI signatures changing at one or several access points), one or more stationary access points obtaining bad results when using a localization method on their position or of access points in their vicinity, and/or routes of a wireless mesh network changing.

For an embodiment, typical average and standard deviation patterns are determined in the training phase wherein stability of the network can be guaranteed.

As described, for an embodiment, the device that performed the characterization is the current device. For an embodiment, the device that performed the characterization is different device than the current device.

For at least some embodiments, the device is a one of the plurality network access points, and further comprising each of the plurality of network access points determining a plurality of wireless signal signatures at a corresponding fixed location within the area. That is, for an embodiment, the device is an access point. By determining the wireless signal signature at the access point, and knowing the exact location of the access point, the location of devices receiving approximately the same wireless signal signature can be estimated.

For at least some embodiments, the network access points determine the plurality of wireless signal signatures based on upstream communication from the at least one of the plurality of current devices. That is, the plurality of wireless signal signatures can be determined based on downlink communication (communication from an access point to the device) and/or uplink communication (communication from the device to an access point).

If the plurality of wireless signal signatures are determined based on downlink communication, the information of the wireless signal signatures can be communicated out-of-band (that is, through some other communication infrastructure than the wireless mesh network) to the network manager server, and/or the information of the wireless signal signatures can be communicated through the upstream access points to the network manager server.

If the plurality of wireless signal signatures are determined based on uplink communication, the information of the wireless signal signatures can be communicated to the network manager server directly (or indirectly through other access points of the wireless mesh network) from the access points that measured the wireless signal signatures.

For an embodiment, the wireless signal signatures are determined at locations of the access points of the wireless mesh network. Later, a location of a device can be estimated by estimating a distance between the device and static network access points—contrast the estimated distance with the estimated location of the device and known locations of the static access points.

As previously described, for an embodiment, each wireless signal signature includes an identifier of each of the plurality of network access points and a characteristic of a wireless signal received through a corresponding one of the plurality of wireless links between the device and the plurality of network access points. For an embodiment, the identifier includes a MAC address of the access point. For an embodiment, the characteristic of the wireless signal includes an RSSI (receive signal strength indicator) of the received signal, and/or a channel of the received signal. It is to be understood that this is not an exhaustive list. That is, additional or alternate characteristics of the wireless signals may be utilized.

For at least some embodiments each wireless signal signature includes N measured wireless signal signatures averaged over time. That is, for a particular location, multiple determinations or measurements of the wireless signals are performed resulting in a single averaged set of wireless signal signatures. The averaging can be performed over different intervals of time (for example, minutes or days). Further, for at least some embodiment, deviations from the average are stored and utilized by at least some of the described embodiments.

At least some embodiments further include tracking estimated locations of at least one of a plurality of current devices over time. At least some embodiments further include aiding the location estimation based on projected locations of each of the plurality of current devices, wherein the projection is based on the tracked estimated location of each of the plurality of current devices. At least some embodiments further include determining whether to re-determine the plurality of wireless signal signatures at the plurality of locations within the area based on the present wireless signal signature of each of the plurality of current devices and the tracking of the estimated locations of each of the plurality of current devices over time.

For at least some embodiments, the plurality of network access points monitor wireless signal transmission between each other, and further include determining whether to re-determine the plurality of wireless signal signatures at the plurality of locations within the area based on determined variations (the characteristic) in the wireless signal transmission between the plurality of network access points.

For at least some embodiments, the characteristic of the wireless signal signatures of the plurality of wireless links between the device and a plurality of network access points at a one of the plurality of locations includes a difference between a measured characteristic of the device and an average characteristic between the device and the plurality of network access points at the plurality of locations. For embodiment the characteristic includes RSSI. For at least some embodiments, the characteristic additionally or alternatively includes the variation of RSSI over time or packet loss (if the device is connected to an access point).

For at least some embodiments, comparing a present wireless signal signature of the current device with plurality of wireless signal signatures comprises comparing the present wireless signal signatures of the current device based on an ordering of an identifier (MAC addresses) of the plurality of network access points, wherein the ordering is based on a received signal characteristic of each of the plurality of network access points.

For at least some embodiments, the plurality of wireless signal signatures at the plurality of locations includes an identifier and a received signal characteristic of at least a portion of the plurality of network access points. For an embodiment, the identifier includes a MAC (media access control) address, and the received signal characteristic includes a received signal strength indicator (RSSI).

For at least some embodiments, in addition the wireless signal signature includes the relative order of the RSSI from other APs (if there are APs with stronger of weaker signals in the vicinity, this order contains a lot of information, so even when the RSSI fluctuates because of temporary condition changes or is of very different strength because the tracking device is not the same as the training device, the order might stay the same). How much the signal fluctuates in a short time interval can also describe a certain location. For an embodiment, wireless signal signature also includes standard deviations or similar measures.

For at least some embodiments, during the tracking phase, different components of different wireless signal signatures are combined utilizing weighting is order to distinguish between importance of specific features.

For at least some embodiments, stationary wireless mesh devices (access points) try to infer their position using wireless signal signatures other than their own, and running a tracking algorithm. If the computed location differs by more than a (relative) threshold relative to its real position, the access point (or network manager server) can test if a different weight distribution resolves the problem or if a re-characterization is necessary.

As previously described, for at least some embodiments, the distributed wireless network form a wireless mesh network, and the at least one condition comprises at least one of the plurality of network access points selecting a new routing path through the wireless mesh network.

At least some embodiments include aiding the location estimation includes refining a search space of the plurality of wireless signal signatures based on at least one signal characteristic of present communication between at least one of the plurality of current devices and at least one network access point. Various embodiments can be utilized for reducing a search space of a database search. Reducing the search space includes obtaining a first estimate of the location of the device. The first estimate can be used to reduce the number of wireless signal signatures that have to be compared, which saves time and processing power.

For an embodiment, the search space (of the location of the device) is reduced by triangulation of signal characteristic of multiple of the network access points. For an embodiment, this includes a device receiving a signal (having an RSSI) from a first access point, and using a geometric method to translate the RSSI to an approximate distance. Channel fading models to determine that for such and RSSI, there is a high probability that the device is within a specific distance dl of the first access point. That is, that there is a high (within a predetermined threshold) probability that the device is within a circular radius dl centered at the first access point. This process can be similarly repeated for other proximate access points. Determination of intersections of the determined circular radiuses of the first and other access points reduces a search space to within the determined intersections.

For at least some embodiments, the access points that appear in the wireless signal signature are analyzed by first considering access points in which the device receives signals. If there are no signatures in this space that are similar enough, the search space is extended around the strongest access point on the convex hull by moving the two lines intersecting at the AP further away from the convex hulls center.

Although specific embodiments have been described and illustrated, the embodiments are not to be limited to the specific forms or arrangements of parts so described and illustrated.

What is claimed:

1. A method of estimating a location within an area, comprising:
   determining a plurality of wireless signal signatures at a plurality of locations within the area, wherein each wireless signal signatures includes a characteristic of a plurality of wireless links between a device and a plurality of network access points at a one of the plurality of locations, wherein the characteristic includes a difference between a measured characteristic of the device and an average characteristic between the device and the plurality of network access points at the plurality of locations;
   receiving, by a network manager server, the plurality of wireless signal signatures;
   receiving, by the network manager server, a present wireless signal signature of a current device;
   estimating locations of the current device, comprising comparing a present wireless signal signature of the current device with the plurality of wireless signal signatures; and
   adaptively re-determining the plurality of wireless signal signatures based on at least one condition of a distributed wireless network that includes the plurality of network access points.

2. The method of claim 1, wherein the device is a one of the plurality network access points, and further comprising each of the plurality of network access points determining a plurality of wireless signal signatures at a corresponding fixed location within the area.

3. The method of claim 1, wherein the network access points determine the plurality of wireless signal signatures based on upstream communication from at least one of a plurality of current devices.

4. The method of claim 1, wherein each wireless signal signature includes an identifier of each of the plurality of network access points and a characteristic of a wireless signal received through a corresponding one of the plurality of wireless links between the device and the plurality of network access points.

5. The method of claim 1, wherein each signature includes N measured signatures averaged over time.

6. The method of claim 1, further comprising tracking estimated locations of at least one of a plurality of current devices over time.

7. The method of claim 6, further comprising aiding the location estimation based on projected locations of each of the plurality of current devices, wherein the projection is based on the tracked estimated location of each of the plurality of current devices.

8. The method of claim 7, further comprising determining whether to re-determine the plurality of wireless signal signatures at the plurality of locations within the area based on the present wireless signal signature of each of the plurality of current devices and the tracking of the estimated locations of each of the plurality of current devices over time.

9. The method of claim 1, wherein the plurality of network access points monitor wireless signal transmission between each other, and further comprising determining whether to re-determine the plurality of wireless signal signatures at the plurality of locations within the area based on determined variations in the wireless signal transmission between the plurality of network access points.

10. The method of claim 1, wherein comparing a present wireless signal signature of the current device with plurality of wireless signal signatures comprises comparing the present wireless signal signatures of the current device based on an ordering of an identifier of the plurality of network access points, wherein the ordering is based on a received signal characteristic of each of the plurality of network access points.

11. The method of claim 1, wherein the plurality of wireless signal signatures at the plurality of locations includes an identifier and a received signal characteristic of at least a portion of the plurality of network access points.

12. The method of claim 1, wherein the distributed wireless network form a wireless mesh network, and the at least one condition comprises at least one of the plurality of network access points selecting a new routing path through the wireless mesh network.

13. The method of claim 1, wherein aiding the location estimation includes refining a search space of the plurality of wireless signal signatures based on at least one signal characteristic of present communication between at least one of a plurality of current devices and at least one network access point.

14. A network manager server of a wireless network, the network manager server operative to:
   receive a plurality of wireless signal signatures at a plurality of locations within the area, wherein each wireless signal signatures includes a characteristic of a plurality of wireless links between a device and a plurality of network access points at a one of the plurality of locations, wherein the characteristic includes a difference between a measured characteristic of the device and an average characteristic between the device and the plurality of network access points at the plurality of locations;
   receive a present wireless signal signature of a current device;
   estimate locations of the current device, comprising comparing a present wireless signal signature of the current device with the plurality of wireless signal signatures; and
   adaptively re-determine the plurality of wireless signal signatures based on at least one condition of a distributed wireless network that includes the plurality of network access points.

15. The network manager server of claim 14, wherein the network manager server is further operative to:
- track estimated locations of at least one of the plurality of current devices over time;
- aid the location estimation based on projected locations of each of the plurality of current devices, wherein the projection is based on the tracked estimated location of each of the plurality of current devices; and
- determine whether to re-determine the plurality of wireless signal signatures at the plurality of locations within the area based on the present wireless signal signature of each of the plurality of current devices and the tracking of the estimated locations of each of the plurality of current devices over time.

16. The network manager server of claim 14, wherein comparing the present wireless signal signature of each of the plurality of current devices with plurality of wireless signal signatures comprises comparing the present wireless signal signatures of each of the plurality of current devices based on an ordering of an identifier of the plurality of network access points, wherein the ordering is based on a received signal characteristic of each of the plurality of network access points.

17. A wireless mesh network, comprising:
- a plurality of wireless mesh network gateways, each gateway connected to an upstream network;
- a plurality of wireless access nodes, each access node wirelessly connected directly to at least one of the plurality wireless mesh network gateways, or indirectly connected to at least one of the plurality wireless mesh network gateways through one or more upstream wireless access node;
- network manager server connected to the wireless mesh network, the network manager server operative to:
- receive a plurality of wireless signal signatures at a plurality of locations within the area, wherein each wireless signal signatures includes a characteristic of a plurality of wireless links between a device and a plurality of network access points at a one of the plurality of locations, wherein the characteristic includes a difference between a measured characteristic of the device and an average characteristic between the device and the plurality of network access points at the plurality of locations;
- receive a present wireless signal signature of a current device;
- estimate locations of the current device, comprising comparing a present wireless signal signature of the current device with plurality of wireless signal signatures; and
- adaptively re-determine the plurality of wireless signal signatures based on at least one condition of a distributed wireless network that includes the plurality of network access points.

18. The wireless mesh network of claim 17, wherein the network manager server is further operative to:
- track estimated locations of at least one of the plurality of current devices over time;
- aid the location estimation based on projected locations of each of the plurality of current devices, wherein the projection is based on the tracked estimated location of each of the plurality of current devices; and
- determine whether to re-determine the plurality of wireless signal signatures at the plurality of locations within the area based on the present wireless signal signature of each of the plurality of current devices and the tracking of the estimated locations of each of the plurality of current devices over time.

19. The wireless mesh network of claim 17, wherein the plurality of network access points monitor wireless signal transmission between each other, and further comprising determining whether to re-determine the plurality of wireless signal signatures at the plurality of locations within the area based on determined variations in the wireless signal transmission between the plurality of network access points.

20. The wireless mesh network of claim 17, wherein comparing the present wireless signal signature of each of the plurality of current devices with plurality of wireless signal signatures comprises comparing the present wireless signal signatures of each of the plurality of current devices based on an ordering of an identifier of the plurality of network access points, wherein the ordering is based on a received signal characteristic of each of the plurality of network access points.

* * * * *